US009462175B2

(12) United States Patent
Kim

(10) Patent No.: US 9,462,175 B2
(45) Date of Patent: Oct. 4, 2016

(54) DIGITAL ANNOTATION-BASED VISUAL RECOGNITION BOOK PRONUNCIATION SYSTEM AND RELATED METHOD OF OPERATION

(71) Applicant: Heekwan Kim, Seoul (KR)

(72) Inventor: Heekwan Kim, Seoul (KR)

( * ) Notice: Subject to any disclaimer, the term of this patent is extended or adjusted under 35 U.S.C. 154(b) by 222 days.

(21) Appl. No.: 14/083,251

(22) Filed: Nov. 18, 2013

(65) Prior Publication Data

US 2015/0138385 A1      May 21, 2015

(51) Int. Cl.
  *G06K 9/00*    (2006.01)
  *G06K 9/46*    (2006.01)
  *H04N 5/232*   (2006.01)

(52) U.S. Cl.
  CPC ...... *H04N 5/23206* (2013.01); *H04N 5/23216* (2013.01); *G06K 9/00671* (2013.01)

(58) Field of Classification Search
  None
  See application file for complete search history.

(56) References Cited

U.S. PATENT DOCUMENTS

| 2013/0191708 A1* | 7/2013 | Song | G06Q 30/06 715/202 |
| 2014/0118800 A1* | 5/2014 | Hwang | H04N 1/00331 358/474 |
| 2014/0254942 A1* | 9/2014 | Liu | G06F 17/30247 382/209 |

* cited by examiner

*Primary Examiner* — Tize Ma
(74) *Attorney, Agent, or Firm* — Invent Capture, LLC.; Samuel S. Cho

(57) ABSTRACT

A digital annotation-based visual recognition book pronunciation system and its method of operation are disclosed. In one embodiment, a mobile application program in the system extracts graphical feature points from a page image of a book captured by an integrated camera lens, transmits the graphical feature points to a digital annotation database executed in a cloud computing server, retrieves a book pronunciation content associated with the page image of the book, and superimposes an icon or a representation of the book pronunciation content on the page image of the book displayed as a real-time augmented application on the display panel of the mobile device. The system further includes the digital annotation database that stores relational data between the page image of the book and the book pronunciation content recited by a human narrator, and a related image analysis and matching program.

17 Claims, 10 Drawing Sheets

A Service Application Example of a Digital Annotation-Based Visual Recognition Book Pronunciation System A System Service Flow Embodiment of a Digital Annotation-Based
Visual Recognition Book Pronunciation System A Service Application Example of a Digital Annotation-Based Visual Recognition Book Pronunciation System

200

A Mobile Application Usage Example of a Digital Annotation-Based
Visual Recognition Book Pronunciation System

400

A Mobile Application Usage Example of a Digital Annotation-Based
Visual Recognition Book Pronunciation System

500

A Book Pronunciation Content Creation and Cloud Computing Server Storage
Example of a Digital Annotation-Based Visual Recognition Book
Pronunciation System

600

An Example of Digital Annotation of Multimedia Dataset(s) to a Book-Related Image Data

700

A Printed Logo Example for a Book Compatible to a Digital Annotation-Based Visual Recognition Book Pronunciation System

800

A Publisher License Fee Business Model for Digital Annotation-Based Visual Recognition Book Pronunciation System

900

An Open Content Marketplace Business Model for Digital Annotation-Based Visual Recognition Book Pronunciation System

1000

A Usage Example of an Open Content Market Place Business Model for Digital Annotation-Based Visual Recognition Book Pronunciation System

1100

A Teaching Curriculum Business Model for Digital Annotation-Based Visual Recognition Book Pronunciation System

1200

A Usage Example of a Teaching Curriculum Business Model for Digital Annotation-Based Visual Recognition Book Pronunciation System

1300

DIGITAL ANNOTATION-BASED VISUAL RECOGNITION BOOK PRONUNCIATION SYSTEM AND RELATED METHOD OF OPERATION

BACKGROUND OF THE INVENTION

The present invention generally relates to visual recognition of an object by an electronic device and also relates to virtually-attaching or associating digitized information to the object. More specifically, the present invention relates to one or more embodiments of digital annotation-based visual recognition book pronunciation systems and related methods of operation.

Modern portable electronic devices, such as "smart" mobile phones and wearable electronic glasses, are increasingly capable of performing visual recognition of certain objects using a camera lens, global positioning system (GPS) coordinate information, electronic map information, and other resources. In some instances, an electronically-recognized object, such as a landmark, a building, and a tourist attraction, enable a portable electronic device and/or a data storage connected to the portable electronic device to retrieve useful information, which can be overlaid on top of the electronically-recognized object on a real-time basis. For example, a user wearing electronic glasses may glance at a landmark, and a transparent display on the electronic glasses may display historical or background information associated with the landmark. The real-time overlaying of information on top of a user's current line of sight is also known as "augmented reality."

A massive-scale visual recognition of objects and digital annotation of various information to the objects are still at an early stage of engineering feasibility and commercialization today. The sole inventor of the present invention had also previously invented a novel massive-scale visual recognition and digital annotation engine, with a trademarked name "Slin'Gooz," which is in the process of being deployed in various industries and market segments. However, various applications involving augmented reality have not yet addressed substantial synergistic benefits in education markets.

For example, in the English as Second Language (ESL) education markets or in the early childhood education markets, only specialized printed publications that embed certain printed dot patterns are able to be read aloud when a specialized text-reading pen scans a particular word using optical character recognition and/or infrared signature detection methods. The existing book pronunciation technologies require specialized text prints for compatibility with the specialized text-reading pen, which significantly limits the availability and the selection of books that can be utilized for voice pronunciation of books' contents. Furthermore, the specialized text-reading pen requires a constant contact to the surface of the book for deciphering the specialized text prints, thereby causing user inconvenience and distraction. Moreover, the existing book pronunciation technologies do not easily enable a third-party entity to create, update, and/or revise book pronunciation contents for a particular book, as the specialized text-reading pen typically only accesses locally-stored voice data and/or locally-stored algorithms for book pronunciations.

Therefore, it may be advantageous to devise a novel book pronunciation system and its related infrastructure that can perform visual recognition on any conventional printed publications for voice pronunciation of conventional printed publication contents, without requiring a specialized text-reading pen or special printed dot patterns only recognized by the specialized text-reading pen. Furthermore, it may also be advantageous to devise a novel book pronunciation system and its related infrastructure that enable a dynamically-updatable selection of voice pronunciation files and contents, which can be virtually-attached to or associated with a physical book or a printed publication via digital annotation across a cloud-computing network.

In addition, it may also be advantageous to devise a mobile application that uniquely utilizes a "smart" portable device (e.g. a smart phone) as a graphical feature points extraction tool for a visual recognition of a particular printed publication, as a voice pronunciation tool for an annotated dataset retrieved from a computer server, and also as a voice pronunciation contents generator for a variety of books printed publications. Moreover, it may also be advantageous to devise a method of operating a novel book pronunciation system and its related infrastructure in a sustainable business ecosystem, which encourages creation, maintenance, and utilization of robust voice pronunciation files and contents.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a digital annotation-based visual recognition book pronunciation system is disclosed. This system comprises: a mobile device with a CPU, a memory unit, a display panel, an integrated camera lens, and a wireless transceiver for data communication; a mobile application program executed on the CPU and the memory unit of the mobile device, wherein the mobile application program extracts graphical feature points from a page image of a book captured by the integrated camera lens, transmits the graphical feature points to a digital annotation database executed in a cloud computing server, retrieves a book pronunciation content associated with the page image of the book, and superimposes an icon or a representation of the book pronunciation content on the page image of the book displayed as a real-time augmented application on the display panel of the mobile device; the digital annotation database executed in the cloud computing server, wherein the digital annotation database stores relational data between the page image of the book and the book pronunciation content recited by a human narrator; an image analysis and matching program executed in the cloud computing server, wherein the image analysis and matching program compares the graphical feature points from the page image of the book against a stored list of images or other graphical feature points in the digital annotation database, and wherein a correct image match allows the mobile device to retrieve the book pronunciation content associated with the page image of the book; and the cloud computing server configured to receive information from or transmit information to the mobile application program executed on the CPU and the memory unit of the mobile device via a wireless data network.

Furthermore, in another embodiment of the invention, a method of operating a digital annotation-based visual recognition book pronunciation system is disclosed. This method comprises the steps of: registering a book cover image and page images of a book to a digital annotation database executed on a cloud computing server using a first mobile device; generating and recording a book pronunciation content associated with the book using the first mobile device; uploading the book pronunciation content to the digital annotation database from the first mobile device to create relational data and linkage among the book cover image, the page images of the book, and the book pronunciation content; transmitting a mobile application program to a second mobile device, wherein the mobile application program is configured to extract graphical feature points from a page image of the book captured by an integrated camera lens, send the graphical feature points to the digital annotation database, retrieve the book pronunciation content associated with the page image of the book, and superimpose an icon or a representation of the book pronunciation content on the page image of the book displayed as a real-time augmented application on a display panel of the second mobile device; and streaming the book pronunciation content to the second mobile device upon a user request made via the mobile application program executed on the second mobile device.

DETAILED DESCRIPTION

Figure 1:
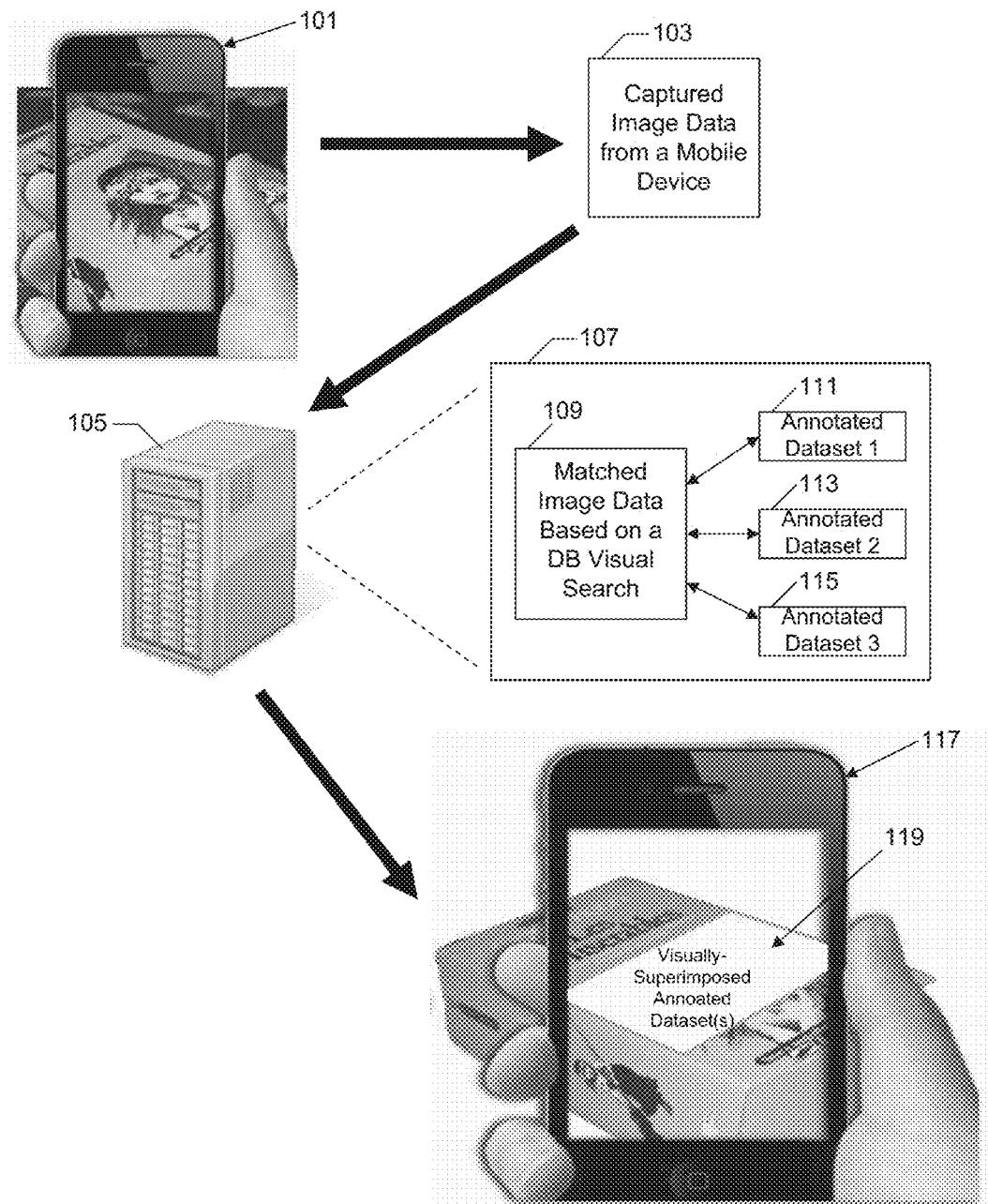
FIG. 1 shows a system service flow embodiment of a digital annotation-based visual recognition book pronunciation system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more digital annotation-based visual recognition book pronunciation systems and related methods of operation. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel book pronunciation system and its related infrastructure that can perform visual recognition on any conventional printed publications for voice pronunciation of conventional printed publication contents, without requiring a specialized text-reading pen or special printed dot patterns only recognized by the specialized text-reading pen.

Another objective of an embodiment of the present invention is to provide a novel book pronunciation system and its related infrastructure that enable a dynamically-updatable selection of voice pronunciation files and contents, which can be virtually-attached to or associated with a physical book or a printed publication via digital annotation across a cloud-computing network.

Yet another objective of an embodiment of the present invention is to provide a mobile application that uniquely utilizes a "smart" portable device (e.g. a smart phone) as a graphical feature points extraction tool for a visual recognition of a particular printed publication, as a voice pronunciation tool for an annotated dataset retrieved from a computer server, and also as a voice pronunciation contents generator for a variety of books printed publications.

In addition, another objective of an embodiment of the present invention is to provide a method of operating a novel book pronunciation system and its related infrastructure in a sustainable business ecosystem, which encourages creation, maintenance, and utilization of robust voice pronunciation files and contents.

For the purpose of describing the invention, a term "digital annotation" is defined as associating one or more pieces of data or datasets with a physical object, which is electronically recognized and stored as image data and/or as graphical feature points in a data storage. For example, a piece of data that undergoes data association and/or linking with an image data of a physical object is called "digitally-annotated." The data association and/or linking (i.e. digital annotation) between the piece of data and the image data of the physical object may be graphically represented as a sticky note (i.e. representing the piece of data) attached to the image or the image data of the physical object.

Furthermore, for the purpose of describing the invention, a term "visual recognition" is defined as electronically-recognizing a physical object by comparing a captured image data and/or graphical feature points extracted from the captured image data with a stored image data and/or stored graphical feature points.

Moreover, for the purpose of describing the invention, a term "book pronunciation" is defined as vocalizing at least some contents of a book or a printed publication by a real human narrator, who records his or her voice using an electronic device, such as a smart phone, a tablet computer, and wearable electronic glasses.

In addition, for the purpose of describing the invention, a term "augmented reality" is defined as displaying, showing, superimposing, and/or embedding textual, multimedia, or other information to one or more objects viewed through a display, a viewfinder, or another electronic unit capable of showing the one or more objects.

Furthermore, for the purpose of describing the invention, a term "cloud" is defined as a data network-connected environment for information access, storage, erasure, and update. The data network-connected environment can be provided using a physical connection, a wireless connection, or both. For example, a cloud computing server can store image data and any associated annotated datasets in a database, and a mobile device that queries for any annotated datasets to a newly-captured image from a mobile application program can retrieve any associated annotated datasets from the cloud computing server via wireless and/or wired data communication over a "cloud" network.

FIG. 1 shows a system service flow (100) embodiment of a digital annotation-based visual recognition book pronunciation system, in accordance with an embodiment of the invention. In a preferred embodiment of the invention, the digital annotation-based visual recognition book pronunciation system comprises a mobile device (101), a mobile application program executed on a CPU and a memory unit of the mobile device (101), a digital annotation database (107) that stores relational data between image data (e.g. 109) and annotated datasets (111, 113, 115) linked and associated with image data (e.g. 109), a cloud computing server (105) that executes the digital annotation database (107), and an image analysis and matching program executed on a CPU and a memory unit of the cloud computing server (105).

In the preferred embodiment of the invention, a mobile electronic device (101) utilizes its integrated camera to capture a book image data using a novel mobile application program capable of sending an image query to a cloud computing server (105). In the preferred embodiment of the invention, the mobile application program executed in the mobile device (101) may transmit the captured image data (103) to the cloud computing server (105), which in turn performs graphical feature points extraction from the captured image data (103) to query a matched image data (109) stored in a digital annotation database operating in the cloud computing server (105). In an alternate embodiment of the invention, the mobile application program executed in the mobile device (101) may first perform graphical feature points extraction from the captured image data (103) before sending the extracted graphical feature points or related data to the cloud computing server (105).

In the preferred embodiment of the invention, if the matched image data (109) is found in the digital annotation database (107), any annotated datasets (111, 113, 115), which are linked and associated with the matched image data (109), may be retrieved and then transmitted to the mobile device (101 or 117). The matching between the captured image data (103) and the matched image data (109) may involve graphical feature points comparisons between the captured image data (103) and the matched image data (109). A probability analysis to determine a likely match or an unlikely match between the captured image data (103) and the matched image data (109) can be performed by an image analysis and matching program executed on a CPU and a memory unit of the cloud computing server (105). The image analysis and matching program are configured to access a variety of datasets and image data in the digital annotation database (107), which is also stored inside or operatively connected to the cloud computing server (105).

Continuing with FIG. 1, in the preferred embodiment of the invention, annotated datasets (111, 113, 115) are typically textual or multimedia (e.g. video, audio, photographs, and etc.) information that are associated with the matched image data (109). In the example as shown in FIG. 1, a user-selected annotated dataset (119) among a plurality of annotated datasets (111, 113, 115) can be visually superimposed on a view of a book through a display panel on a mobile device (117). Typically, the user is given menu choices in a mobile application program running in the mobile device to inspect a list of annotated datasets and select a particular annotated dataset.

In the example as shown in FIG. 1, the user-selected annotated dataset (119) is visually superimposed on top of a book cover. The user-selected annotated dataset (119) may be an audio file icon, a video file icon, a photograph, a hyperlink, or another source of information that is superimposed on top of the view of the book cover through the display panel on the mobile device (117). In some embodiments of the invention, the user may interact with the user-selected annotated dataset (119) by touching an icon, a graphics representation, or a text link within the superimposed space containing a representation of the user-selected annotated dataset (119). For example, if a sound file icon is displayed on top of the view of the book cover through the display panel on the mobile device (117), the user may initiate book pronunciation by touching the sound file icon.

Figure 2:
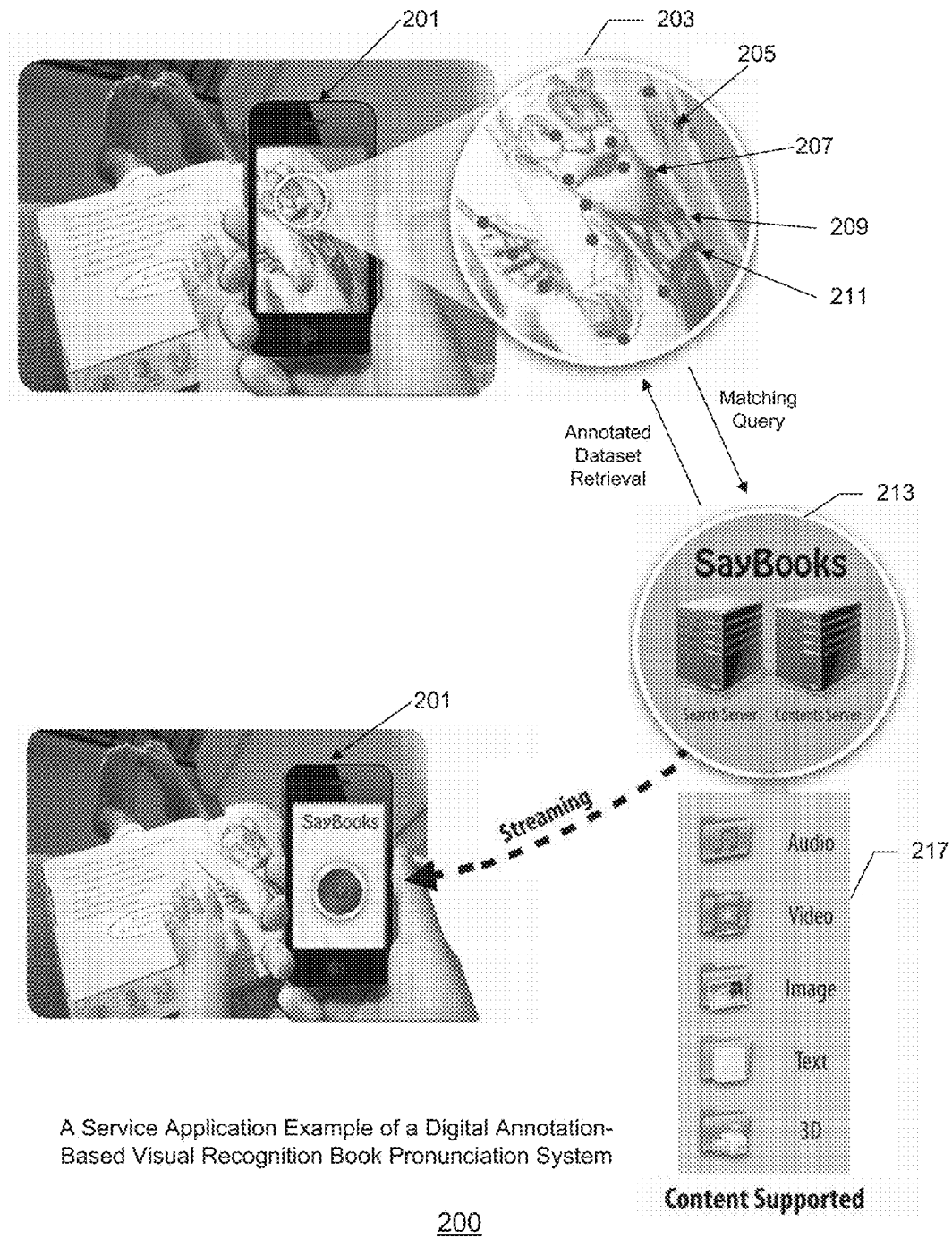
FIG. 2 shows a service application example of a digital annotation-based visual recognition book pronunciation system, in accordance with an embodiment of the invention.

FIG. 2 shows a service application example (200) of a digital annotation-based visual recognition book pronunciation system, in accordance with an embodiment of the invention. In this embodiment of the invention, a mobile electronic device (201) utilizes its integrated camera to capture a book image data in real time. Typically, the real-time book image data is processed by a novel mobile application program capable of sending an image query to a cloud computing server (213). In this embodiment of the invention, the mobile application program executed in the mobile device (201) may first perform graphical feature points extraction from the captured image data (203) before sending the extracted graphical feature points (205, 207, 209, 211) or related data to the cloud computing server (213). In an alternate embodiment of the invention, the mobile application program executed in the mobile device (201) may transmit the captured image data (203) to the cloud computing server (213) first, which in turn performs graphical feature points extraction from the captured image data (203) to extract the graphical feature points (205, 207, 209, 211). Then, the graphical feature points (205, 207, 209, 211) can be used to query a matched image data stored in a digital annotation database operating in the cloud computing server (213).

In the service application example (200) as shown in FIG. 2, if the digital annotation database operating in the cloud computing server (213) finds an appropriate match for the captured image data (203) or the graphical feature points derived from it, annotated datasets (217) that are associated and linked with the matched image data can be retrieved for real-time streaming or transmission to the mobile device (201). In one embodiment of the invention, if the matched image data is found in the digital annotation database operating in the cloud computing server (213), any annotated datasets (217) that are linked and associated with the matched image data may be retrieved and then transmitted to the mobile device (201). If the image data stored in the digital annotation database and the captured image data (203) do not match successfully, then a notification message indicating that no matching image is found can be transmitted to the mobile device (201), instead of a selection menu for accessing the annotated datasets (217). The matching between the captured image data (203) and the matched image data may involve graphical feature points (205, 207, 209, 211) comparisons between the captured image data (203) and the matched image data.

In a preferred embodiment of the invention, a probability analysis to determine a likely match or an unlikely match between the captured image data (203) and the matched image data can be performed by an image analysis and matching program executed on a CPU and a memory unit of the cloud computing server (213). The image analysis and matching program are configured to access a variety of datasets and image data in the digital annotation database, which is also stored inside or operatively connected to the cloud computing server (213).

Continuing with FIG. 2, once at least a portion of the annotated datasets are streamed or transmitted to the mobile device (201), one or more icons for the annotated datasets (217) may appear "virtually attached" to an image of a book viewed through a display panel of the mobile device (201), depending on a particular need of an application. Furthermore, the mobile application program executed on a CPU and a memory unit of the mobile device (201) may initiate a multimedia action, such as pronouncing contents of the book that matched the image data of the book stored in the digital annotation database in the cloud computing server (213).

In a preferred embodiment of the invention, the annotated datasets (217) for the matched image of the book are stored in a relational database that associates an image data of a particular book with the annotated datasets (217) for the book. The creation of the annotated datasets (217) may be performed by a content creator, a publisher, or a user by electronically submitting textual and/or multimedia contents, which they believe are related to the book. Examples of the annotated datasets (217) include, but are not limited to, audio, video, image, text, and three-dimensional graphics data, as shown in FIG. 2.

In the example as shown in FIG. 2, an audio file icon appears in the display panel of the mobile device (201) for book pronunciation, once the digital annotation database operating in the cloud computing server (213) finds the matched image data and makes the associated annotated datasets (217) available for download or retrieval by the mobile device (201). Typically, the mobile application program executed on the CPU and the memory unit of the mobile device (201) can display a selection of book pronunciation options or other information from annotated datasets (217) from the cloud computing server (213) to allow the user to select a desired content replay option, before the book pronunciation is initiated in the mobile device (201). In one embodiment of the invention, a user-selected annotated dataset may be an audio file icon, a video file icon, a photograph, a hyperlink, or another source of information viewable on the display panel on the mobile device (201). In some embodiments of the invention, the user may interact with the user-selected annotated dataset by touching an icon, a graphics representation, or a text link containing a representation of the user-selected annotated dataset. For example, as shown in FIG. 2, the sound file icon displayed on the display panel of the mobile device (201) may activate a book pronunciation from the user-selected annotated dataset retrieved from the digital annotation database, when it is touched by the user's finger.

Figure 3:
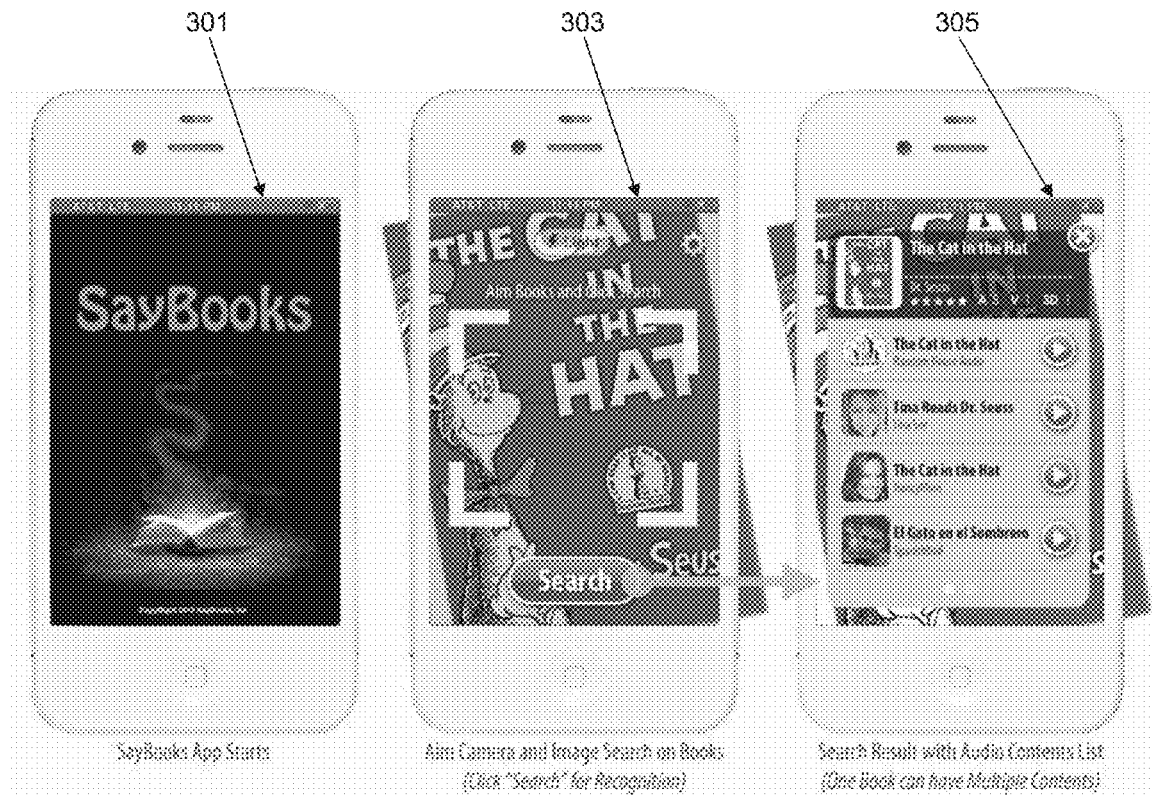
FIG. 3 shows a mobile application usage example of a digital annotation-based visual recognition book pronunciation system, in accordance with an embodiment of the invention.

FIG. 3 shows a mobile application usage example (300) of a digital annotation-based visual recognition book pronunciation system, in accordance with an embodiment of the invention. In the embodiment of the invention as shown in FIG. 3, a mobile application program called "SayBooks" is first executed on a CPU and a memory unit of a mobile device, as shown on a first screenshot (301). Then, a user can aim an integrated camera of the mobile device to a book cover or to a page within the book, which triggers the mobile application program to initiate transmission of relevant captured image data and/or graphical feature points to a digital annotation database to conduct an image match search, as shown in a second screenshot (303). Preferably, the digital annotation database is executed in the cloud computing server. In another embodiment of the invention, at least a part of the digital annotation database may reside in a local data storage of the mobile device.

If the image match search is successful, then any annotated datasets stored in the digital annotation database may be retrieved by the mobile application program based on a user's menu selections. In the embodiment of the invention as disclosed in FIG. 3, a user is given a list of audio contents, each of which is related to vocal book pronunciation of the book identified by the image match search, as shown in a third screenshot (305). For example, book pronunciation contents for a book called "The Cat in the Hat" is provided as a list of audio contents, once the digital annotation-based visual recognition book pronunciation system identified the image of the book and its related annotated datasets. In this example, the related annotated datasets to "The Cat in the Hat" are four content choices (i.e. "Random House Audio," "Tina See," "NancyMom," and "SpanishDad") for book pronunciation, as shown in the third screenshot (305). In the example as shown in FIG. 3, the user may touch a particular menu entry item at his or her discretion to initiate book pronunciation for "The Cat in the Hat."

Figure 4:
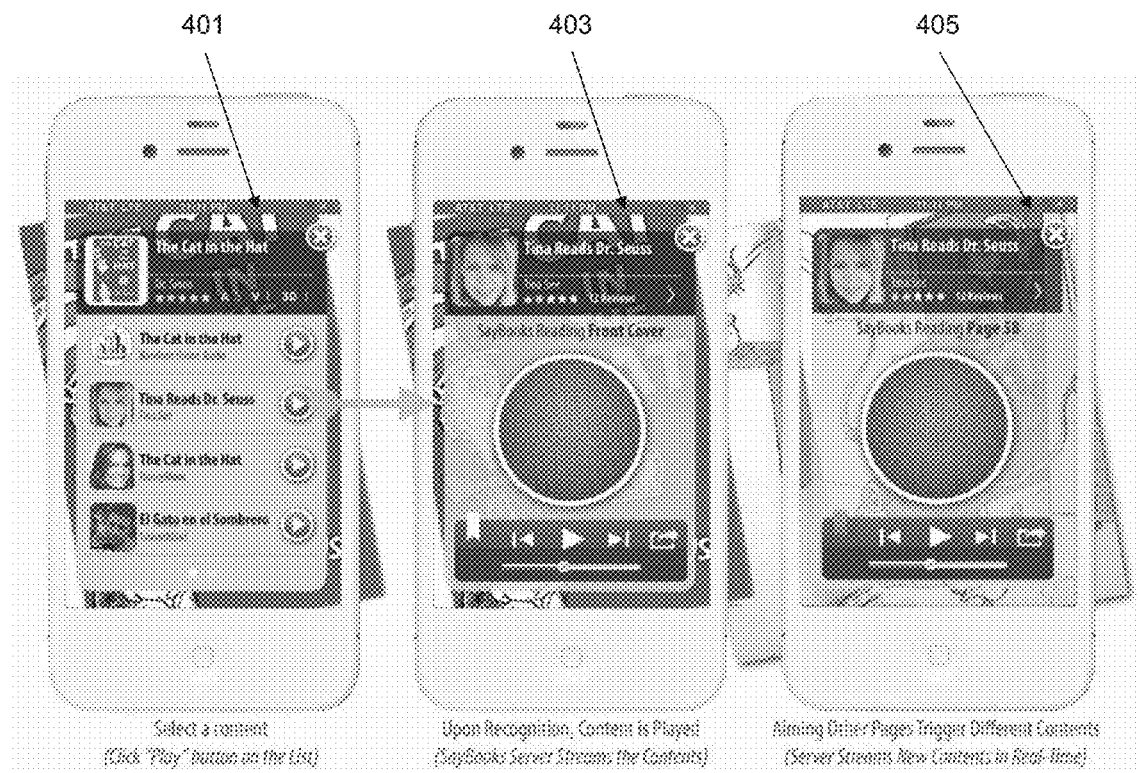
FIG. 4 shows a continued application example from FIG. 3, or another mobile application usage example of a digital annotation-based visual recognition book pronunciation system, in accordance with one or more embodiments of the invention.

FIG. 4 shows a continued application example (400) from FIG. 3, or another mobile application usage example of a digital annotation-based visual recognition book pronunciation system, in accordance with one or more embodiments of the invention. In one embodiment of the invention in which each screenshot (401, 403, 405) shown in FIG. 4 represents the continued application example (400) from FIG. 3, the user from the mobile application usage example (300) clicks a "play" button for a book pronunciation content called "Tina Reads Dr. Seuss," as shown in a first screenshot (401).

Then, in one embodiment of the invention, the mobile application program executed on the mobile device may begin to play already locally-downloaded voice pronunciation content for "Tina Reads Dr. Seuss," as shown in a second screenshot (403). In an alternate embodiment of the invention, the mobile application program executed in the mobile device may begin to stream the voice pronunciation content for "Tina Reads Dr. Seuss" from a digital annotation database in a cloud computing server, as also shown in a second screenshot (403).

Furthermore, in one embodiment of the invention as shown in a third screenshot (405), if a user aims the integrated camera of the mobile device to a different page of the book, the change in aiming of the integrated camera to the different page can trigger playback of different contents from the voice pronunciation content for "Tina Reads Dr. Seuss." For example, the second screenshot (403) shows playing the front cover of the voice pronunciation content for "Tina Reads Dr. Seuss." Once the integrated camera of the mobile device points Page 58 instead of the front cover, as shown in the third screenshot (405), the mobile application program begins to play Page 58 of "The Cat in the Hat" with voice pronunciation provided by "Tina Reads Dr. Seuss."

In another embodiment of the invention, the screenshot sequence provided by the first screenshot (401), the second screenshot (403), and the third screenshot (405) may be part of a different user application utilizing the digital annotation-based visual recognition book pronunciation system, instead of being a continued application from FIG. 3.

Figure 5:
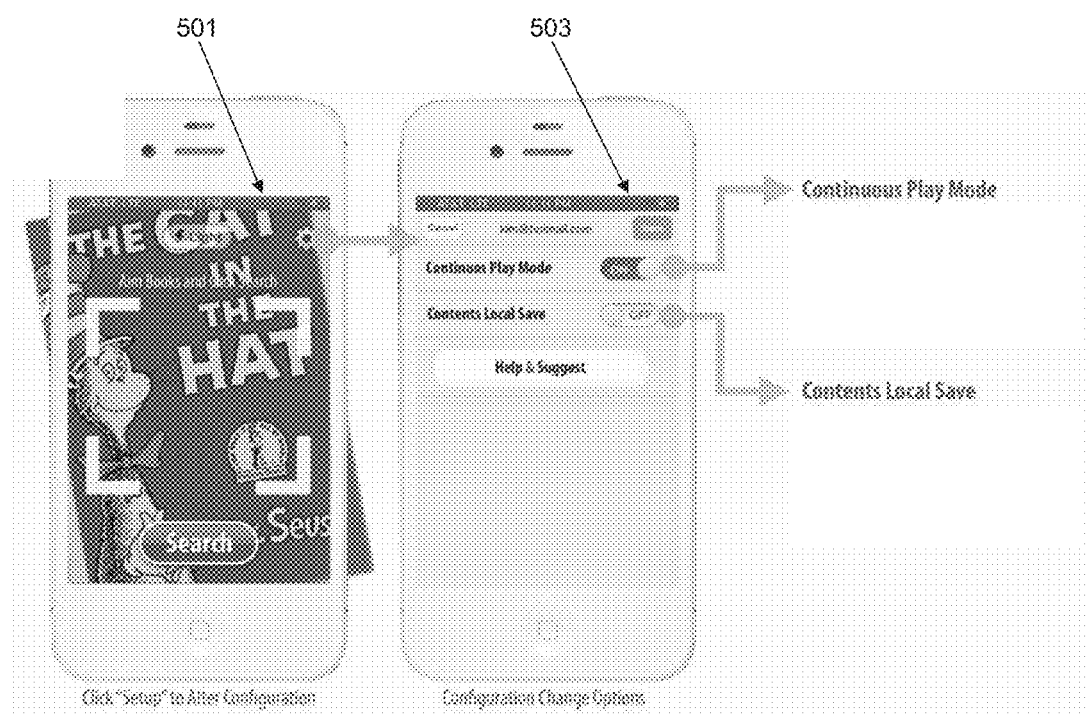
FIG. 5 shows another mobile application usage example of a digital annotation-based visual recognition book pronunciation system, in accordance with an embodiment of the invention.

FIG. 5 shows another mobile application usage example (500) of a digital annotation-based visual recognition book pronunciation system, in accordance with an embodiment of the invention. In a preferred embodiment of the invention, the mobile application usage example (500) in FIG. 5 is a related continued example from FIG. 3 and FIG. 4. As shown in a first screenshot (501), a setup menu for a mobile application program displayed on a touch-screen display panel of a mobile device can be touched or clicked by a user, which takes the setup menu to a second screenshot (503). As shown in the second screenshot (503) in this embodiment of the invention, a "continuous play mode" on/off slider and a "contents local save" on/off slider can be adjusted by the user.

In the embodiment of the invention as shown in FIG. 5, if the "continuous play mode" is on, a selected book pronunciation content is continuously played once visual recognition of a book, image matching for the book, and annotated dataset retrieval to the mobile device are completed for the book, even if an integrated camera lens of the mobile device no longer aims at a specific content in the book. On the other hand, if the "continuous play mode" is off, then the user is required to continue aiming the integrated camera lens of the mobile device at the specific content for continuous play of the selected book pronunciation content.

Furthermore, if the "contents local save" mode is on, any selected annotated datasets that have been streamed and/or retrieved by the mobile device are saved in a local storage of the mobile device. Typically, most of the selected annotated datasets may be book pronunciation audio contents or other multimedia files involving video and audio files. On the other hand, if the "contents local save" mode is off, then any selected annotated datasets that have been streamed and/or retrieved by the mobile device are not permanently stored in the local storage of the mobile device, other than being temporarily stored for buffering of a multimedia streaming from a cloud computing server.

Figure 6:
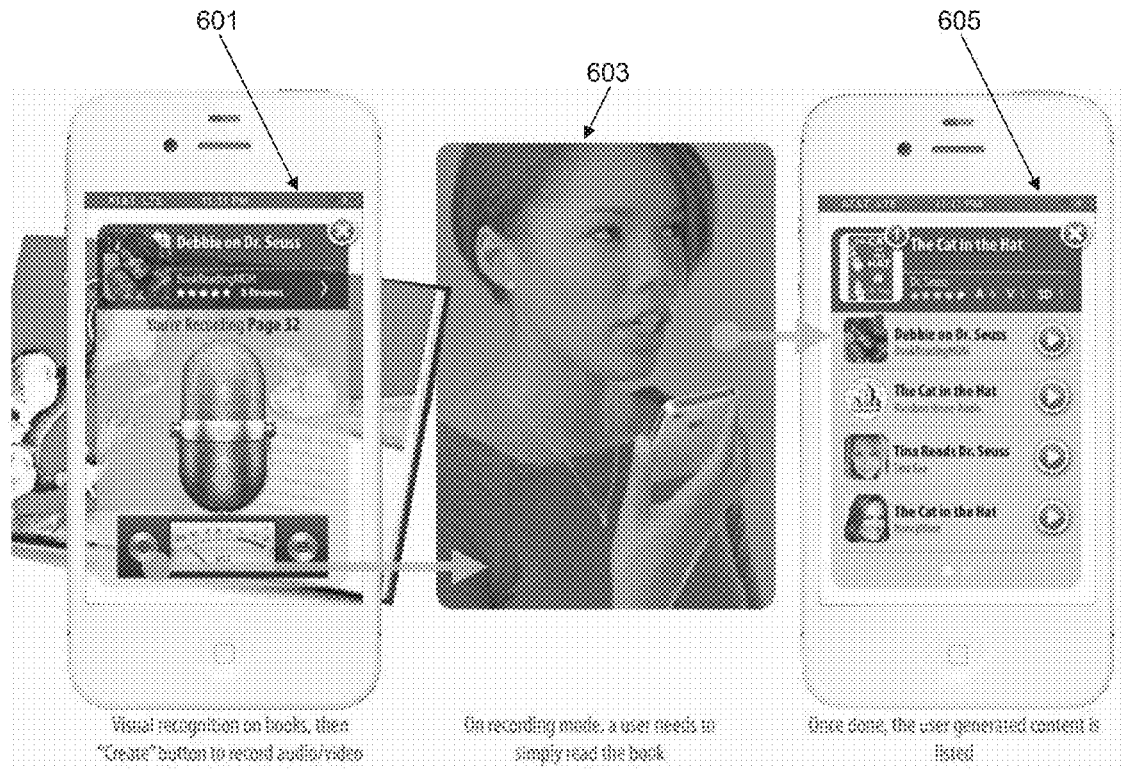
FIG. 6 shows a book pronunciation content creation and cloud computing server storage example of a digital annotation-based visual recognition book pronunciation system, in accordance with an embodiment of the invention.

FIG. 6 shows a book pronunciation content creation and cloud computing server storage example (600) of a digital annotation-based visual recognition book pronunciation system, in accordance with an embodiment of the invention. In this embodiment of the invention, the user of the book pronunciation content and cloud computing server storage example (600) is a content creator, a book publisher, a teacher, or a content-adding user. The user in this embodiment operates a mobile application program on a mobile device to identify a book to be visually-recognized, and then aims an integrated camera lens of the mobile device to an image of the book, which enables the mobile application program to transmit relevant data-pairing information to a digital annotation database.

In one embodiment of the invention, the captured image of the book is compared against a plurality of book-related image data in the digital annotation database operating in a cloud computing server. If a matching image is found, then any content created by the user is dynamically associated with the matching image as a newly-annotated dataset. On the other hand, if the matching image is not found in the digital annotation database, then a new data entry for the captured image of the book is created in the digital annotation database, and is subsequently associated with any annotated datasets provided by a content creator, a book publisher, a teacher, and/or a user.

As shown in a first screenshot (601) of FIG. 6, the user can pair the book with a content to be created by aiming the integrated camera lens to a page in the book. Then, by touching a button on a menu screen that provides the functionality of recording or creating the content, the user can initiate recording and/or creating his or her book pronunciation content, as shown in a second screenshot (603) of FIG. 6. An audio microphone integrated in the mobile device may be utilized for any audio recordings for creating the user's book pronunciation content. In a preferred embodiment of the invention, the user's book pronunciation content is a direct recitation of texts contained in the book. However, in other embodiments of the invention, the user's book pronunciation content generation may also add instructive, descriptive, and/or additional comments other than the direct recitation of the texts alone.

After the user completes creating and/or recording the book pronunciation content, the mobile application program executed in the mobile device is configured to transmit the book pronunciation content to the digital annotation database operated in the cloud computing server. If the digital annotation database successfully pairs the image of the book (i.e. "The Cat in the Hat") with the newly-created book pronunciation content, the cloud computing server can transmit an updated list of book pronunciation contents to the mobile device. Then, the mobile device can display the updated list of book pronunciation contents for the book, which now includes the user's newly-created book pronunciation content (i.e. "Debbie on Dr. Seuss"), as shown in a third screenshot (605) of FIG. 6.

The embodiment of the invention as shown FIG. 6 is one of many embodiments of the invention for content creation and pairing with book images. For example, book pronunciation content creation and book image-to-book pronunciation content pairing in a digital annotation database may be completed by a book publisher or a professional content creator that generates a large number of book pronunciation contents, which may be processed in parallel by a multiple number of people.

Figure 7:
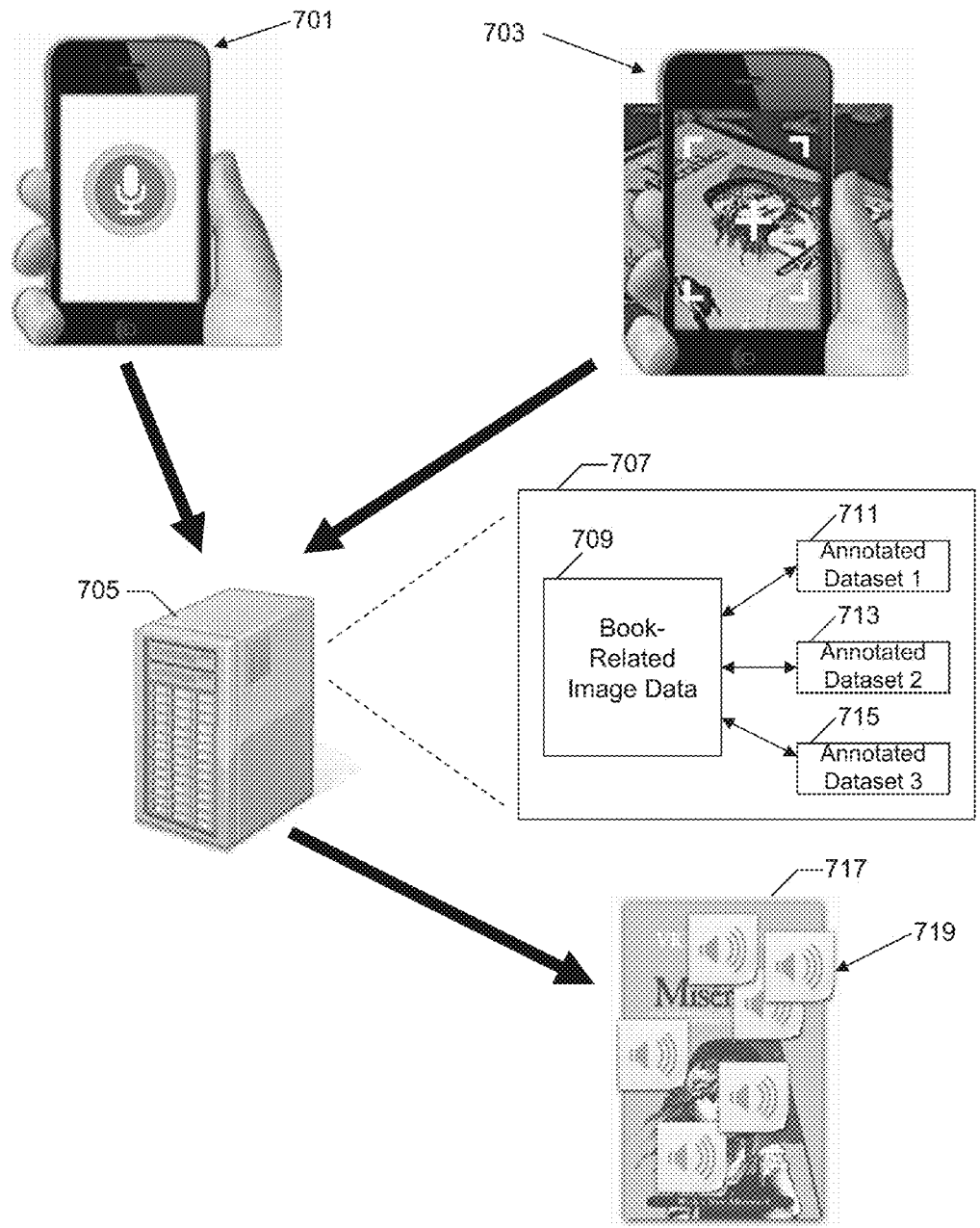
FIG. 7 shows an example of digital annotation of multimedia datasets to a book-related image data, in accordance with an embodiment of the invention.

FIG. 7 shows an example of digital annotation (700) of multimedia datasets to a book-related image data using a digital annotation-based visual recognition book pronunciation system, in accordance with an embodiment of the invention. In one embodiment of the invention, the digital annotation-based visual recognition book pronunciation system comprises a first mobile device (701), a second mobile device (703), a mobile application programs executed on a CPU and a memory unit of each of the mobile devices (701, 703), a digital annotation database (707) that stores relational data between image data (e.g. 709) and annotated datasets (711, 713, 715) linked and associated with image data (e.g. 709), a cloud computing server (705) that executes the digital annotation database (707), and an image analysis and matching program executed on a CPU and a memory unit of the cloud computing server (705).

In this embodiment of the invention, the second mobile device (703) utilizes its integrated camera to capture a book image data using a novel mobile application program capable of sending an image query to a cloud computing server (705). The first mobile device (701), on the other hand, records a voice pronunciation content, and transmits the newly-recorded voice pronunciation content to the cloud computing server (705) for data pairing between the book-related image data (709) and the newly-recorded voice pronunciation content. In a preferred embodiment of the invention, the first mobile device (701) and the second mobile device (703) may be a single electronic device that serves functions of capturing the book image data, recording the voice pronunciation content, and transmitting relevant data for pairing and storage in the digital annotation database (707) in the cloud computing server (705). In another embodiment of the invention, the first mobile device (701) may be utilized by a first user, and the second mobile device (703) may be utilized by a second user.

In the embodiment of the invention as shown in FIG. 7, the mobile application program executed in the first mobile device (703) may transmit the captured image data of the book to the cloud computing server (705), which in turn performs graphical feature points extraction from the captured image data to query a matched book-related image data (709) stored in a digital annotation database (707) operating in the cloud computing server (705). In an alternate embodiment of the invention, the mobile application program executed in the first mobile device (703) may first perform graphical feature points extraction from the captured image data before sending the extracted graphical feature points or related data to the cloud computing server (705).

If the matched book-related image data (709) is found in the digital annotation database (707), then any annotated datasets (711, 713, 715), which are linked and associated with the matched book-related image data (709), may be retrieved and then transmitted to any connected mobile devices. Furthermore, if the first mobile device (701) transmits a user's book pronunciation content associated with the matched book-related image data (709) to the digital annotation database (707), then the user's book pronunciation content from the first mobile device (701) becomes a new annotated dataset, which is dynamically linked and associated with the matched book-related image data (709) stored in the digital annotation database (707). This new annotated dataset is then readily accessible over the cloud network by any connected mobile devices executing the mobile application program for the digital annotation-based visual recognition book pronunciation system.

Furthermore, this new annotated can graphically appear as a virtual sticky annotation icon (719) attached on a book image (717), when the book image is viewed through a camera lens of the mobile device in an augmented reality environment, as shown in FIG. 7. Other virtual sticky annotation icons also attached to the book image (717) also represent other annotated datasets to the matched book-related image data (709), such as book pronunciation contents recited by other content providers, related video files, or other textual or multimedia contents. The visualization of virtual sticky annotation icons, as shown in FIG. 7, and the visually-superimposed annotated datasets, as previously shown in FIG. 1, are part of a novel augmented reality environment provided by the mobile application program and the rest of the digital annotation-based visual recognition book pronunciation system.

Figure 8:
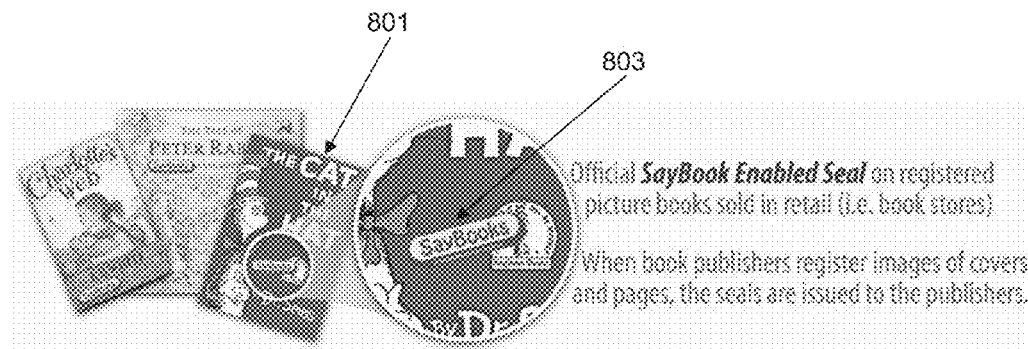
FIG. 8 shows a printed logo example for a book compatible to a digital annotation-based visual recognition book pronunciation system, in accordance with an embodiment of the invention.

FIG. 8 shows a printed logo example (800) for a book compatible to a digital annotation-based visual recognition book pronunciation system, in accordance with an embodiment of the invention. As a method of operating the digital annotation-based visual recognition book pronunciation system, in one embodiment of the invention, it may be desirable for a book publisher to indicate a book pronunciation system compatibility of a book (801) by printing a system compatibility logo (803) on the book's cover. The printed logo example (800) in FIG. 8 shows the system compatibility logo (803) indicating "SayBook Enabled Seal." In this example, any books that have "SayBook Enabled Seal" logos have registered images of books in a digital annotation database.

In a preferred embodiment of the invention, book publishers may also additionally provide book pronunciation contents as annotated datasets to the digital annotation database, wherein the annotated datasets are paired with the corresponding registered images of books at the time of book publication. Alternatively, book publishers may not provide any book pronunciation contents, but may simply register images of books in the digital annotation database, and rely on third-party content creators and/or users to add book pronunciation contents to the digital annotation database.

Figure 9:
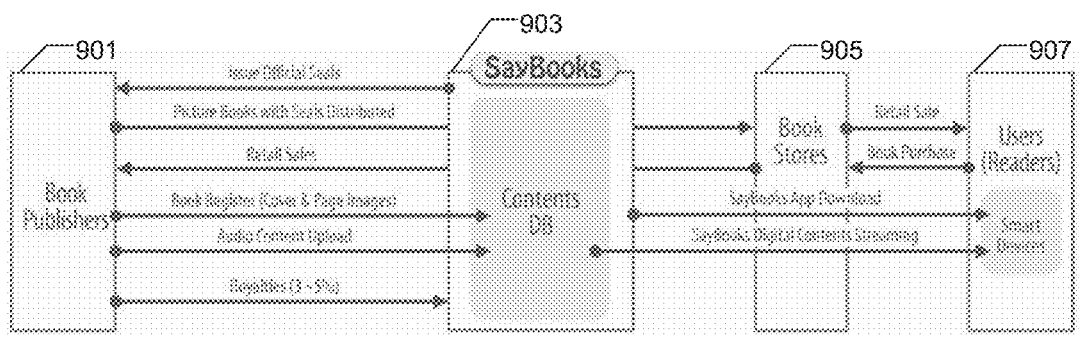
FIG. 9 shows a publisher license fee business model for digital annotation-based visual recognition book pronunciation system, in accordance with an embodiment of the invention.

FIG. 9 shows a publisher license fee business model (900) for digital annotation-based visual recognition book pronunciation system, in accordance with an embodiment of the invention. The publisher license fee business model (900) comprises four entities: a book publisher (901), a digital annotation database content provider (903), a bookstore (905), and a consumer (e.g. a book reader, a user, and etc.) (907). In the publisher license fee business model (900), the book publisher (901) registers a book cover image and at least some page images of a book, which the book publisher (901) is authorized to publish as paper-printed materials. Preferably, the book publisher (901) may incorporate a system compatibility logo (e.g. 803 of FIG. 8) on the book cover of the paper-printed versions of the book. The process of book image registration generally involves uploading book cover and book page image data to a digital annotation database in a cloud computing server, which is operated by the digital annotation database content provider (903). Furthermore, the book publisher (901) also uploads book pronunciation contents to the digital annotation database, wherein the book pronunciation contents correspond to the registered book cover image and the registered book page images. In addition, the book publisher (901) also distributes a paper-printed version of the book to the bookstore (905), so that the consumer (907) can purchase the paper-printed version of the book from the bookstore (905). The bookstore (905) may be a physical bookstore, or an Internet-based online bookstore.

Subsequently, when the consumer (907) purchases the book from the bookstore (905), the consumer can utilize a mobile device, such as a smart phone or a tablet computer, to download a book pronunciation mobile application program (e.g. SayBooks App), which provides a user menu to download and stream a variety of book pronunciation contents stored in the digital annotation database. The digital annotation database associates the book cover image and the book page images with any uploaded book pronunciation contents and other annotated datasets in a relational database. If the consumer (907) wants to download a particular book pronunciation content or another annotated dataset associated with the book from the digital annotation database, then the digital annotation database content provider (903) can provide book pronunciation content streaming or other digital content streaming to the consumer (907) from the cloud computing server.

The publisher license fee business model (900) assumes that the paper-printed versions of the book from the book publisher (901) will experience higher volume sales due to the book's compatibility with the digital annotation-based visual recognition book pronunciation system. Therefore, the book publisher (901) may be motivated to provide some paper-printed book sales royalties to the digital annotation database content provider (903) for the book publisher's rights to upload book pronunciation contents and other digital contents in the digital annotation database operated by the digital annotation database content provider (903). In the publisher license fee business model (900) as shown in FIG. 9, the book publisher (901) may pay three to five percent of the paper-printed book sales revenue as royalties to the digital annotation database content provider (903). In this business model, the bookstore (905) typically does not pay royalties to or share revenues with the digital annotation database content provider (903). However, in some embodiments of the invention, it may be desirable to allow the bookstore (905) to either pay royalties to the digital annotation database content provider (903), or alternatively, share revenues with the digital annotation database content provider (903).

Figure 10:
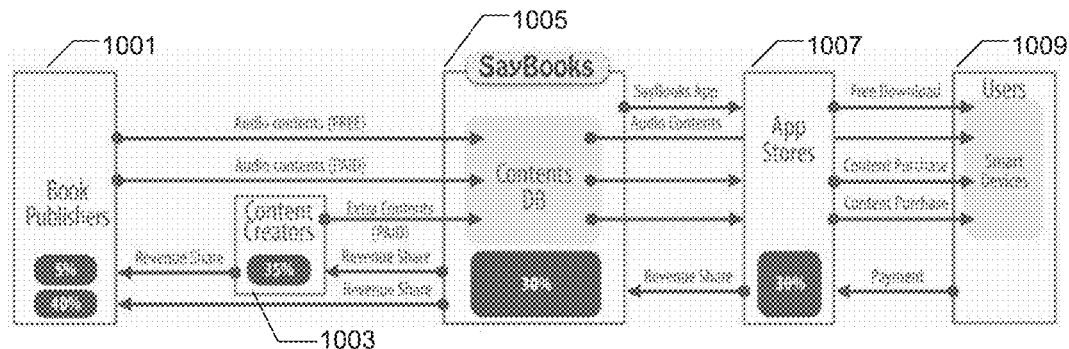
FIG. 10 shows an open content market place business model for digital annotation-based visual recognition book pronunciation system, in accordance with an embodiment of the invention.

FIG. 10 shows an open content market place business model (1000) for digital annotation-based visual recognition book pronunciation system, in accordance with an embodiment of the invention. The open content market place business model (1000) comprises five entities: a book publisher (1001), a third-party content creator (1003), a digital annotation database content provider (1005), a mobile application store (1007), and a consumer (e.g. a book reader, a user, and etc.) (1009). In the open content market place business model (1000), the book publisher (1001) registers a book cover image and at least some page images of a book, which the book publisher (1001) is authorized to publish as paper-printed materials. Preferably, the book publisher (1001) may incorporate a system compatibility logo (e.g. 803 of FIG. 8) on the book cover of the paper-printed versions of the book. The process of book image registration generally involves uploading book cover and book page image data to a digital annotation database in a cloud computing server, which is operated by the digital annotation database content provider (1005). Furthermore, the book publisher (1005) also uploads book pronunciation contents to the digital annotation database, wherein the book pronunciation contents correspond to the registered book cover image and the registered book page images.

In the open content market place business model (1000) as shown in FIG. 10, a third-party content creator (1003) is also empowered by the digital annotation database content provider (1005) to add extra book pronunciation contents and/or other digital contents associated with the book. Typically, any extra book pronunciation contents and/or other digital contents provided by the third-party content creator (1003) rely on paid download license fees from the consumer (1009). The digital annotation database managed by the digital annotation database content provider (1005) associates the book cover image and the book page images with any uploaded book pronunciation contents and other annotated datasets in a relational database. If the consumer (1009) desires to download a particular book pronunciation content or another annotated dataset associated with the book from the digital annotation database, then the digital annotation database content provider (1003) can provide book pronunciation content streaming or other digital content streaming to the consumer (1009) from the cloud computing server.

Furthermore, the open content market place business model (1000) also involves the mobile application store (1007), such as Apple's App Store or Android's Play Store, which enables widespread availability of the book pronunciation contents and/or other digital contents provided by the book publisher (1001) and the third-party content creator (1003). Preferably, the mobile application store (1007) is dynamically linked to the digital annotation database of the digital annotation database content provider (1005), so that any updated book pronunciation contents and other digital contents for the book can be readily downloaded and/or streamed to the consumer's mobile device through the mobile application store (1007).

Then, when the consumer (1009) purchases the paper-printed version of the book from an online or offline bookstore, the consumer can utilize a mobile device, such as a smart phone or a tablet computer, to download a book pronunciation mobile application program (e.g. SayBooks App) from the mobile application store (1007) or from the digital annotation database of the digital annotation database content provider (1005). The book pronunciation mobile application program (e.g. SayBooks App) provides a user menu to download and stream a variety of book pronunciation contents stored in the digital annotation database.

The open content market place business model (1000) is designed to share revenues generated from the consumer's content download fees with multiple entities. For example, when the consumer (1009) pays a content download fee to the mobile application store (1007) related to the book, the mobile application store (1007), the digital annotation database content provider (1005), and the book publisher (1001) can all share revenues at specific percentage ratios. If the third-party content creator (1003) is not involved in the content downloaded by the consumer (1009), then the revenue sharing ratios may be thirty percent for the mobile application store (1007), thirty percent for the digital annotation database content provider (1005), and forty percent for the book publisher (1001), in one example as shown in FIG. 10. On the other hand, if the third-party content creator (1003) is involved in the content downloaded by the consumer (1009), then the revenue sharing ratios may be thirty percent for the mobile application store (1007), thirty percent for the digital annotation database content provider (1005), thirty-five percent for the third-party content creator (1003), and five percent for the book publisher (1001), as also shown in FIG. 10.

Figure 11:
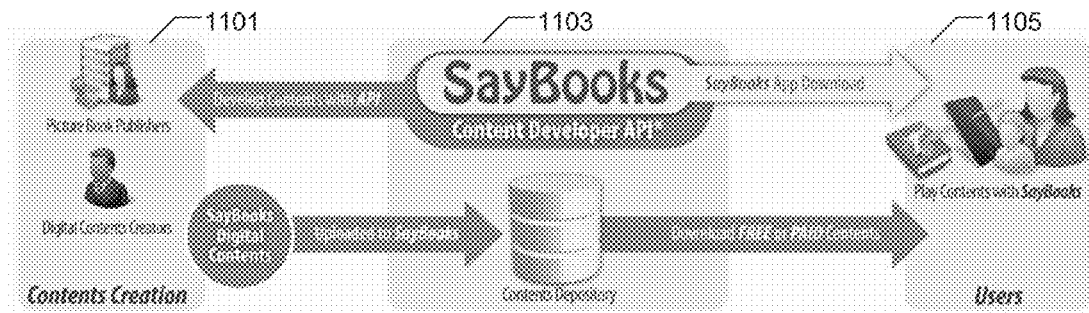
FIG. 11 shows a usage example of an open content marketplace business model for digital annotation-based visual recognition book pronunciation system, in accordance with an embodiment of the invention.

FIG. 11 shows a usage example (1100) of an open content marketplace business model for digital annotation-based visual recognition book pronunciation system, in accordance with an embodiment of the invention. As shown in this figure, book pronunciation content creation (1101) are performed by book publishers and digital content creators, who utilize application programming interfaces (API's) provided by a digital annotation database content provider (1103) to develop and upload various book pronunciation contents and other digital contents associated with books. Once various book pronunciation contents and other digital contents associated with books are uploaded to a digital annotation database operated by the digital annotation database content provider (1103), a consumer (e.g. a book reader, a user, and etc.) (1105) is able to download free or paid book pronunciation contents and other digital contents from the digital annotation database operated by the digital annotation database content provider (1103).

Figure 12:
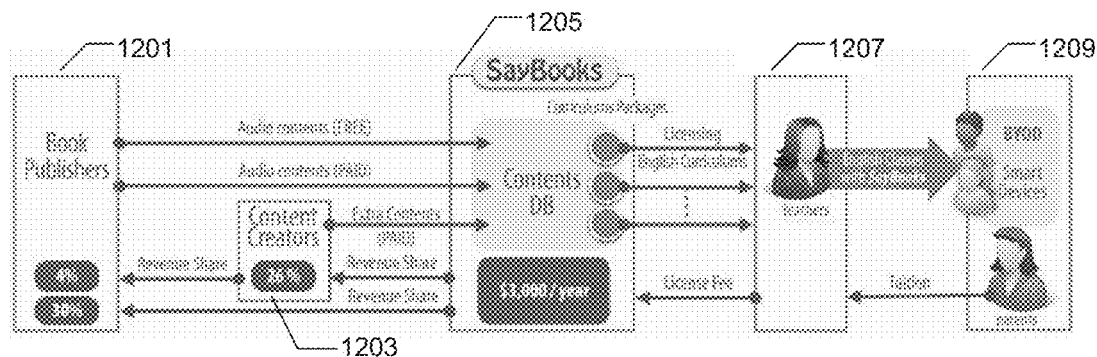
FIG. 12 shows a teaching curriculum business model for digital annotation-based visual recognition book pronunciation system, in accordance with an embodiment of the invention.

FIG. 12 shows a teaching curriculum business model (1200) for digital annotation-based visual recognition book pronunciation system, in accordance with an embodiment of the invention. The teaching curriculum business model (1200) comprises five entities: a book publisher (1201), a third-party content creator (1203), a digital annotation database content provider (1205), a teacher (1207), and a consumer (e.g. a student, a parent, a casual user, and etc.) (1209). In the teaching curriculum business model (1200), the book publisher (1201) registers a book cover image and at least some page images of a book, which the book publisher (1201) is authorized to publish as paper-printed materials. Preferably, the book contains educational material for a particular student population. Furthermore, the book publisher (1201) may incorporate a system compatibility logo (e.g. 803 of FIG. 8) on the book cover of the paper-printed versions of the book. The process of book image registration generally involves uploading book cover and book page image data to a digital annotation database in a cloud computing server, which is operated by the digital annotation database content provider (1205). Moreover, the book publisher (1205) also uploads book pronunciation contents to the digital annotation database, wherein the book pronunciation contents correspond to the registered book cover image and the registered book page images.

In the teaching curriculum business model (1200) as shown in FIG. 12, a third-party content creator (1203) is typically an educational material creator, and is also empowered by the digital annotation database content provider (1205) to add extra book pronunciation contents and/or other digital contents associated with the book. Typically, any extra book pronunciation contents and/or other digital contents provided by the third-party content creator (1203) rely on paid download license fees from the consumer (1209). The digital annotation database managed by the digital annotation database content provider (1205) associates the book cover image and the book page images with any uploaded book pronunciation contents and other annotated datasets in a relational database. If the consumer (1209) desires to download a particular book pronunciation content or another annotated dataset associated with the book from the digital annotation database, then the digital annotation database content provider (1203) can provide book pronunciation content streaming or other digital content streaming to the consumer (1209) from the cloud computing server.

Furthermore, the teaching curriculum business model (1200) also involves the teacher (1207) who gives in-person or video-based instruction to the consumer. The teacher (1207) can utilize the book pronunciation contents and/or other digital contents provided by the book publisher (1201) and the third-party content creator (1203) as supplementary teaching materials. Furthermore, the paper-printed version of the book may serve as a paper-based textbook to a group of students. In some instances, the teacher (1207) may directly encourage downloading of certain book pronunciation contents and/or other digital contents associated with a textbook or another printed instruction material. Furthermore, in some instances, the digital annotation database content provider (1205) may organize and manage curriculum packages, which the teacher (1207) and the consumer (1209) can readily download to their mobile devices.

Continuing with FIG. 12, when the consumer (1209) purchases the paper-printed version of the book (e.g. a textbook) from an online or offline bookstore, or from the teacher (1207), the consumer can utilize a mobile device, such as a smart phone or a tablet computer, to download a book pronunciation mobile application program (e.g. Say-Books App) from the digital annotation database of the digital annotation database content provider (1205). The book pronunciation mobile application program (e.g. Say-Books App) provides a user menu to download and stream a variety of book pronunciation contents stored in the digital annotation database.

The teaching curriculum business model (1200) is designed to share revenues generated from the consumer's content download fees with multiple entities. For example, when the consumer (1209) pays a tuition to the teacher (1207), the digital annotation database content provider (1205) and the book publisher (1201) can share revenues at specific percentage ratios. If the third-party content creator (1203) is not involved in the content downloaded by the consumer (1209), then the revenue sharing ratios may be a fixed amount (e.g. $3,000) per year or a certain percentage for the digital annotation database content provider (1205), with certain percentages (e.g. thirty percent) allocated to the book publisher (1201), in one example as shown in FIG. 12. On the other hand, if the third-party content creator (1203) is involved in the content downloaded by the consumer (1209), then the revenue sharing ratios also involve allocating certain percentages to the third-party content creator (1203), as also shown in FIG. 12.

Figure 13:
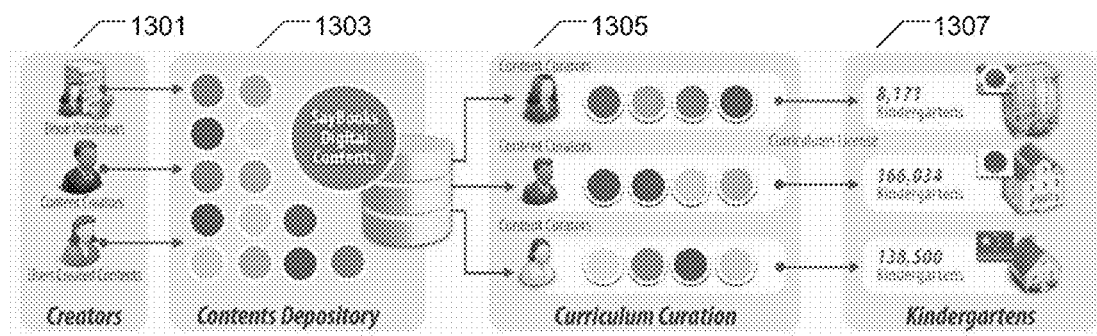
FIG. 13 shows a usage example of a teaching curriculum business model for digital annotation-based visual recognition book pronunciation system, in accordance with an embodiment of the invention.

FIG. 13 shows a usage example (1300) of a teaching curriculum business model for digital annotation-based visual recognition book pronunciation system, in accordance with an embodiment of the invention. As shown in this figure, book publishers, content creators, and content-creating users perform book pronunciation content creation (1301). The book pronunciation content creation (1301) can utilize application programming interfaces (API's) provided by a digital annotation database content provider to develop and upload various book pronunciation contents and other digital contents associated with books. Typically, the books and their related book pronunciation contents are educational materials in the teaching curriculum business model. As shown in FIG. 13, the digital annotation database content provider operates a curriculum contents depository (1303), which is typically stored in a cloud computing server executing a digital annotation database in its CPU and memory units.

In the teaching curriculum business model, once various book pronunciation contents and other digital contents associated with books are uploaded to a digital annotation database operated by the digital annotation database content provider, one or more content curators (1305) organize and create customized teaching curriculum for educational needs of various segments of student population. These content curators may be teachers themselves or professionals who primarily create curriculum for various segments of student population. After each curriculum is organized and created by the content curators (1305), data link relationships for curriculums with various combinations of book pronunciation contents and other digital contents may be stored in the digital annotation database. Then, a consumer (e.g. a school, a book reader, a teacher, a student, or a casual user) (1307) is able to download free or paid book pronunciation contents and other digital contents from the digital annotation database operated by the digital annotation database content provider. In one embodiment of the invention, the downloading of the book pronunciation contents and other digital contents may be covered by tuition paid to teachers or educational institutions. In another embodiment of the invention, the consumer (1307) is a school or a teacher who pays a curriculum license fee to the content curators (1305), as shown in FIG. 13.

One or more digital annotation-based visual recognition book pronunciation systems and related methods of operation have been disclosed in the descriptions above and also in the corresponding drawings. Various embodiments of the present invention exhibit several advantages over conventional electronic methods and systems for book pronunciations. For example, an embodiment of the present invention provides a novel book pronunciation system and its related infrastructure that can perform visual recognition on any conventional printed publications for voice pronunciation of conventional printed publication contents, without requiring a specialized text-reading pen or special printed dot patterns only recognized by the specialized text-reading pen.

Furthermore, an embodiment of the present invention also provides a novel book pronunciation system and its related infrastructure that enable a dynamically-updatable selection of voice pronunciation files and contents, which can be virtually-attached to or associated with a physical book or a printed publication via digital annotation across a cloud-computing network. In addition, an embodiment of the present invention also provides a mobile application that uniquely utilizes a "smart" portable device (e.g. a smart phone) as a graphical feature points extraction tool for a visual recognition of a particular printed publication, as a voice pronunciation tool for an annotated dataset retrieved from a computer server, and also as a voice pronunciation contents generator for a variety of books printed publications. Moreover, an embodiment of the present invention also provides a method of operating a novel book pronunciation system and its related infrastructure in a sustainable business ecosystem, which encourages creation, maintenance, and utilization of robust voice pronunciation files and contents.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A digital annotation-based visual recognition book pronunciation system, the system comprising:
   a mobile device with a CPU, a memory unit, a display panel, an integrated camera lens, and a wireless transceiver for data communication;
   a mobile application program executed on the CPU and the memory unit of the mobile device, wherein the mobile application program extracts graphical feature points from a page image of a book captured by the integrated camera lens, transmits the graphical feature points to a digital annotation database executed in a cloud computing server, retrieves a book pronunciation content associated with the page image of the book, and superimposes an icon or a representation of the book pronunciation content on a real-time image of a nearby physical book, which is displayed on the display panel of the mobile device as a real-time augmented application;
   the digital annotation database executed in the cloud computing server, wherein the digital annotation database stores relational data between the page image of the book and the book pronunciation content recited by a human narrator;
   an image analysis and matching program executed in the cloud computing server, wherein the image analysis and matching program compares the graphical feature points from the page image of the book against a stored list of images or other graphical feature points in the digital annotation database, and wherein a correct image match allows the mobile device to retrieve the book pronunciation content associated with the page image of the book;
   the book pronunciation content decoded by the mobile application program and played back as a voice audio narration from the mobile device, wherein the voice audio narration is synchronized to a user's real-time page turn of the nearby physical book, which provides an automatic transition from one audio narration section to another audio narration section to match a textual content of a currently-viewed page of the nearby physical book captured by the integrated camera lens, as the user flips from a previous page to the currently-viewed page on the nearby physical book; and
   the cloud computing server configured to receive information from or transmit information to the mobile application program executed on the CPU and the memory unit of the mobile device via a wireless data network.

2. The system of claim 1, further comprising other annotated datasets stored in the digital annotation database as additional relational data between the page image of the book and the other annotated datasets.

3. The system of claim 2, wherein the other annotated datasets comprise video, audio, three-dimensional graphics, text, image, or other information associated with the page image of the book.

4. The system of claim 1, further comprising a second mobile device with an audio microphone, a second CPU, a second memory unit, a second display panel, a second integrated camera lens, and a second wireless transceiver for data communication, wherein the second mobile device records a user's voice narration for the page image of the book, and then uploads the user's voice narration as a new voice pronunciation content paired to the page image of the book in the digital annotation database.

5. The system of claim 1, wherein the mobile device is a smart phone, a tablet computer, or another portable electronic device.

6. The system of claim 1, wherein the mobile application program incorporates a continuous play mode that allows the mobile device to continue playing the book pronunciation content, even if the integrated camera lens no longer points to the page image of the book.

7. The system of claim 1, wherein the mobile application program incorporates a contents local save mode that allows the mobile device to store the book pronunciation content in a local data storage in the mobile device, even after a buffer memory for streaming or downloading of the book pronunciation content is deleted or overwritten.

8. The system of claim 1, wherein the icon or the representation of the book pronunciation content on the page image of the book displayed as the real-time augmented application on the display panel of the mobile device is a virtual sticky icon that plays its content when touched on the display panel.

9. The system of claim 1, further comprising a mobile application store computer server that routes or relays the digital annotation database to a plurality of users utilizing a plurality of mobile devices.

10. The system of claim 1, wherein the graphical feature points transmitted from the mobile device to the digital annotation database are a database query to retrieve the book pronunciation content for streaming or download to the mobile device.

11. A method of operating a digital annotation-based visual recognition book pronunciation system, the method comprising the steps of:
registering a book cover image and page images of a book to a digital annotation database executed on a cloud computing server using a first mobile device;
generating and recording a book pronunciation content associated with the book using the first mobile device;
uploading the book pronunciation content to the digital annotation database from the first mobile device to create relational data and linkage among the book cover image, the page images of the book, and the book pronunciation content;
transmitting a mobile application program to a second mobile device, wherein the mobile application program is configured to extract graphical feature points from a page image of the book captured by an integrated camera lens, send the graphical feature points to the digital annotation database, retrieve the book pronunciation content associated with the page image of the book, and superimpose an icon or a representation of the book pronunciation content on a real-time image of a nearby physical book, which is displayed on a display panel of the second mobile device as a real-time augmented application;
streaming the book pronunciation content to the second mobile device upon a user request made via the mobile application program executed on the second mobile device;
decoding the book pronunciation content from the mobile application program as a voice audio narration; and
synchronizing the voice audio narration to a user's real-time page turn of the nearby physical book by automatically transitioning from one audio narration section to another audio narration section to match a textual content of a currently-viewed page of the nearby physical book captured by the integrated camera lens, as the user flips from a previous page to the currently-viewed page on the nearby physical book.

12. The method of claim 11, further comprising a step of making a payment to the cloud computing server for a user's download license associated with the book pronunciation content.

13. The method of claim 11, further comprising a step of playing the book pronunciation content on the second mobile device, when the icon or the representation of the book pronunciation content on the page image of the book displayed as the real-time augmented application on the display panel of the second mobile device is activated by a user's finger.

14. The method of claim 11, wherein the first mobile device is utilized by a book publisher or a content creator.

15. The method of claim 14, wherein the book publisher pays a percentage of paper-printed book sales as royalties to a digital annotation database content provider.

16. The method of claim 12, further comprising a mobile application store computer server that routes or relays the digital annotation database to a plurality of users accessing a plurality of mobile devices.

17. The method of claim 16, wherein revenues generated from the payment for the user's download license is shared with at least one of a first provider for the mobile application store computer server, a second provider for the digital annotation database, a book publisher, a content creator, and a teacher.

* * * * *